United States Patent [19]

Osborne

[11] Patent Number: 5,098,221
[45] Date of Patent: Mar. 24, 1992

[54] FLEXIBLE DOUBLE-CONTAINMENT PIPING SYSTEM FOR UNDERGROUND STORAGE TANKS

[76] Inventor: Keith J. Osborne, 600 Enterprise Ave., Ste. 218, Oak Brook, Ill. 60521

[21] Appl. No.: 411,385

[22] Filed: Sep. 22, 1989

Related U.S. Application Data

[63] Continuation-in-part of Ser. No. 286,893, Dec. 20, 1988.

[51] Int. Cl.5 ............................................ B65D 25/24
[52] U.S. Cl. ...................................... 405/52; 405/128; 73/49.2; 285/353
[58] Field of Search .................. 405/52, 53, 154, 184; 285/138, 192, 236, 93, 133.1; 73/49.2 T, 49.5 R, 40.5 R, 49.1

[56] References Cited

U.S. PATENT DOCUMENTS

| | | | |
|---|---|---|---|
| 1,188,446 | 6/1916 | Haines | 137/234.6 |
| 2,268,263 | 12/1941 | Newell et al. | 285/15 |
| 2,336,150 | 12/1943 | Horvath | 137/234.6 |
| 2,546,348 | 3/1951 | Schuman | 285/138 X |
| 2,956,586 | 10/1960 | Zeigler et al. | 285/133.1 X |
| 3,559,408 | 2/1971 | Earnhart | 405/52 X |
| 3,721,270 | 3/1973 | Wittgenstein | 73/49.1 X |
| 4,009,739 | 3/1977 | Weatherford | 141/59 |
| 4,062,376 | 12/1977 | McGrath | 73/49.1 X |
| 4,094,536 | 6/1978 | Cole et al. | 285/353 X |
| 4,110,947 | 9/1978 | Murray et al. | 405/54 X |
| 4,127,286 | 11/1978 | Albertsen | 285/41 |
| 4,149,568 | 4/1979 | Kuntz et al. | 138/114 |
| 4,449,853 | 5/1984 | Mennella et al. | 405/184 |
| 4,519,634 | 5/1985 | Hand | 285/353 X |
| 4,639,164 | 1/1987 | Pugnale et al. | 405/54 |
| 4,644,780 | 2/1987 | Jeter | 73/40.5 R |
| 4,682,911 | 7/1987 | Moreland | 405/53 |
| 4,739,648 | 4/1988 | Horner | 73/49.2 |
| 4,787,772 | 11/1988 | Wagner | 405/53 |
| 4,796,676 | 1/1989 | Hendershot et al. | 73/49.2 X |
| 4,805,444 | 2/1989 | Webb | 73/40.5 R |
| 4,912,966 | 4/1990 | Sharp | 73/49.2 T |
| 4,932,257 | 6/1990 | Webb | 285/21 X |
| 4,971,477 | 11/1990 | Webb et al. | 405/154 |

FOREIGN PATENT DOCUMENTS

WO90/04157 4/1990 PCT Int'l Appl. .

*Primary Examiner*—Dennis L. Taylor
*Attorney, Agent, or Firm*—Lockwood, Alex, FitzGibbon & Cummings

[57] ABSTRACT

A double piping system connected between an underground storage tank and an above-ground liquid dispenser, e.g. gasoline, provides containment to prevent the pumped liquid from leaking from the underground piping system into the environment. The piping system can be tested or replaced from grade without excavating or breaking ground at the installed tank site. Particularly advantageous assembly and disassembly of the system is provided by a coupling that involves cooperation between a bayonet-type quick-disconnect coupling for the primary piping and a bellows for the secondary piping. The bellows retracts to provide access to the quick-disconnect fitting for replacement of the inner piping. When extended, the bellows is sealably connected with a containment piping coaxial with the primary piping, so as to provide an annular containment volume around the quick-disconnect coupling.

17 Claims, 8 Drawing Sheets

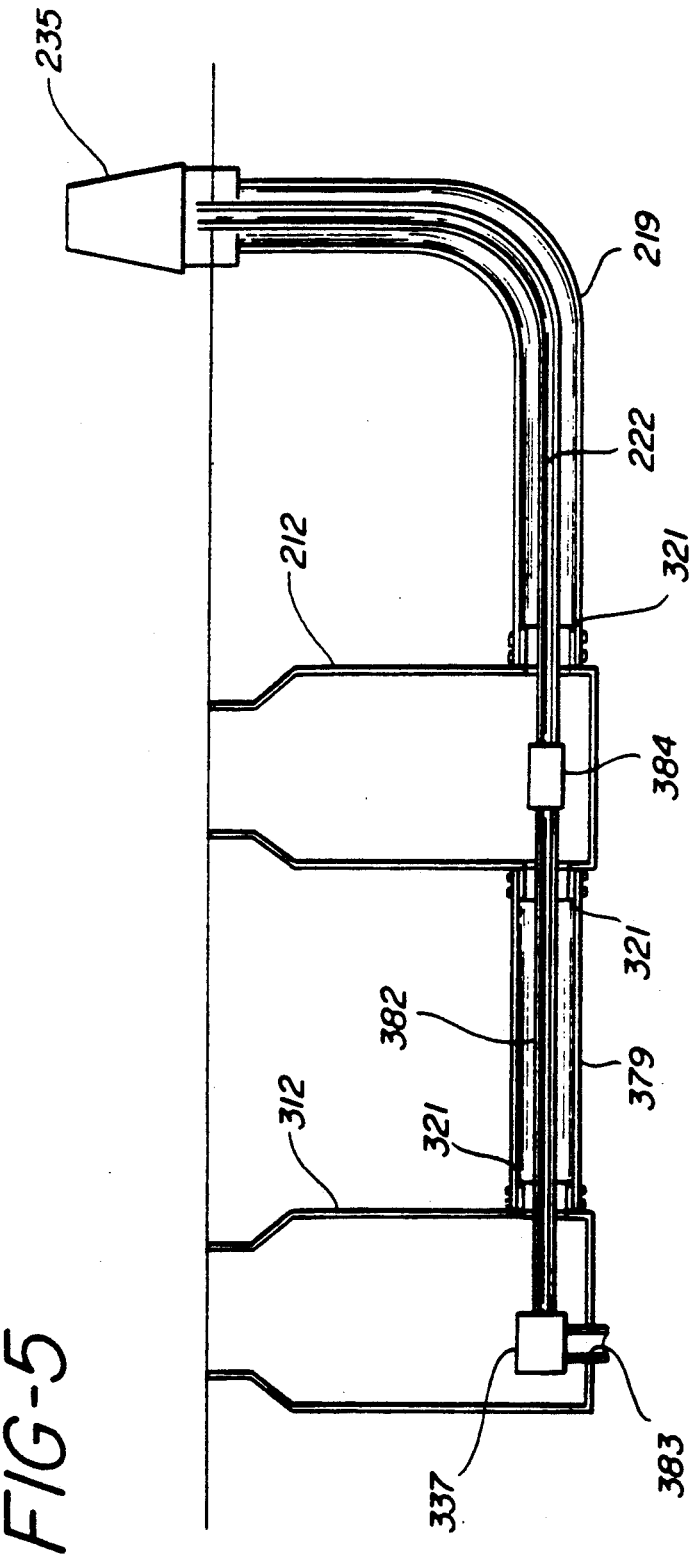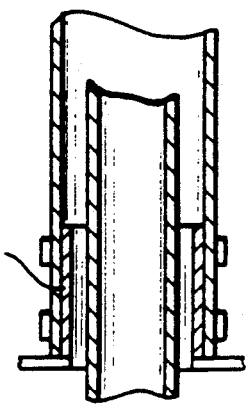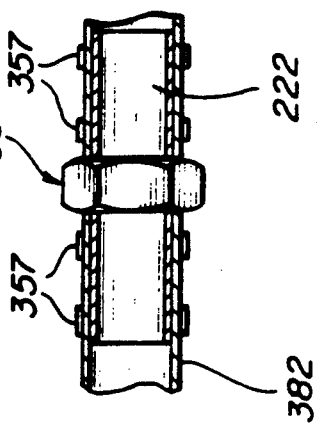

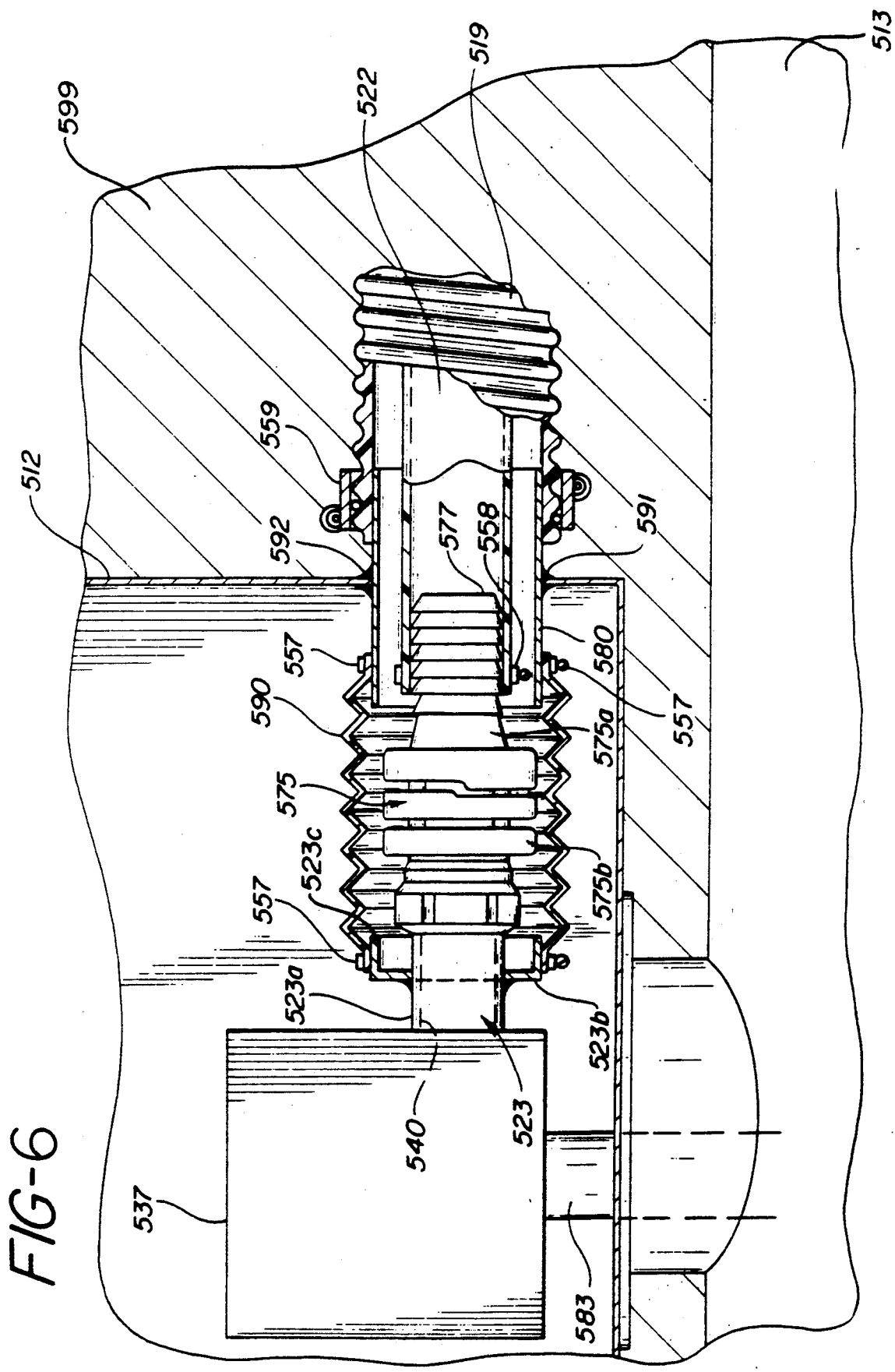

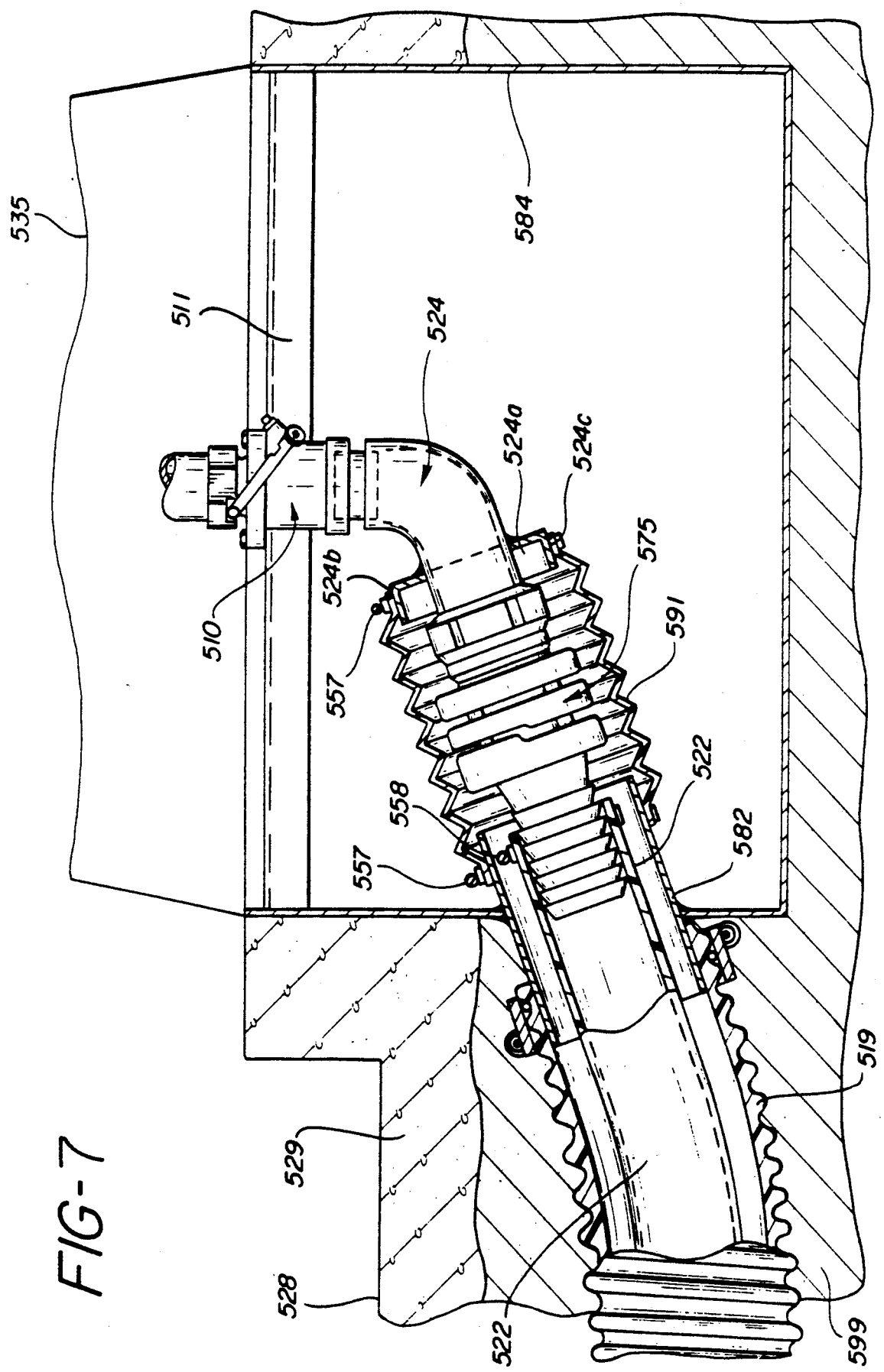

FLEXIBLE DOUBLE-CONTAINMENT PIPING SYSTEM FOR UNDERGROUND STORAGE TANKS This is a continuation-in-part of U.S. patent application Ser. No. 07/286,893, filed Dec. 20, 1988.

FIELD OF THE INVENTION

The present invention relates to an improved underground piping system for underground tanks used to store hydrocarbon fuels or the like.

BACKGROUND OF THE INVENTION

Studies by the United States Environmental Protection Agency have found that approximately two-thirds of the leaks in underground storage tanks can be traced to failure of an underground piping system rather than to the tank itself. Specific locations include joints such as unions, elbows and couplings where two straight pieces of pipe are joined together, connections to underground equipment, and corroded steel pipes.

Also, structural failure in piping systems can occur when movements take place in tanks and/or piping systems due to high water tables or settling ground movement. This is particularly true in the case of rigid fiberglass piping systems which are subject to cracking or outright structural failure.

SUMMARY OF THE INVENTION

The present invention provides a piping system for conveying fluid from the outlet port of a pump to the inlet port of a fluid dispenser. The system comprises a primary pipe of flexible material having an inlet end and an outlet end, a secondary pipe of flexible material generally surrounding the primary pipe, a pump coupling removably coupled to the outlet port of the pump, a dispenser coupling removably coupled to the inlet port of the fluid dispenser, and two secondary couplings. A secondary pump coupling removably secures the pump end of the secondary pipe to the outer piping adapter of the pump coupling. A secondary dispenser coupling removably secures the dispenser end of the secondary pipe to the outer piping adapter of the dispenser coupling.

The pump coupling comprises an inner pipe in communication with the outlet port of the pump and an outer piping adapter concentric with the inner pipe. The dispenser coupling comprises an inner pipe in communication with the inlet port of the fluid dispenser and an outer piping adapter concentric with the inner pipe. The inlet end of the primary pipe is removably secured to the inner pipe of the pump coupling, and the outlet end of the pipe is removably secured to the inner pipe of the dispenser coupling.

The secondary pump coupling comprises a first male coupling adapted to mate with the outer piping adapter of the pump coupling and a second male coupling adapted to mate with the pump end of the secondary pipe.

In accordance with the present invention, the annular volume defined by the primary pipe, the secondary pipe, the pump coupling, the secondary pump coupling, the dispenser coupling and the secondary dispenser coupling provides containment for the fluid in the event of leakage from the primary pipe.

It is an object of the present invention to prevent or decrease the inadvertent leakage of hazardous liquid such as hydrocarbon fuel into the environment from an underground storage tank piping system.

The present invention provides a double-walled flexible piping system especially suitable for underground tanks used to store hydrocarbon fuels.

An advantage of the present invention is that only two connections are required in the underground piping system.

Another advantage is that the piping can be replaced without excavating or breaking ground at the installed tank site.

An additional advantage is that piping is readily accessible from grade for structural testing without excavating or breaking ground at the installed tank site.

It is a feature of the present invention that in the event of a leak of the piping, the leak is virtually totally contained within the annular space between the primary and secondary pipe or in the pipe containment chamber and is not discharged to the surroundings.

An additional feature of a preferred embodiment of the present invention is that a sensor placed between the walls of the two concentric pipes provides a method of detecting any release from the primary pipe, e.g. causing an alarm to sound.

An additional feature of a preferred embodiment is that any leakage from the primary pipe into the annular space between the primary and secondary pipes can be drained into a containment chamber, where it can be removed without contaminating the environment.

An additional feature of an alternative embodiment is that any leakage into the annular space between the primary and secondary pipe can be removed by suction at the dispenser connection above ground, where it can be removed without contaminating the environment.

An embodiment of the invention which provides particularly advantageous assembly and disassembly involves cooperation between a bayonet-type quick-disconnect coupling for the primary piping and a bellows. The bellows retracts to provide access to the quick-disconnect fitting for replacement of the inner piping. When extended, the bellows is sealably connected with a containment piping coaxial with the primary piping, so as to provide an annular containment volume around the quick-disconnect coupling.

BRIEF DESCRIPTION OF THE DRAWINGS

FIG. 5 is a schematic elevational cross-section of the flexible piping run/manifold connection to other underground storage tank systems.

FIGS. 5A and 5B are each elevational views in cross-section showing in greater detail certain elements depicted schematically in FIG. 5.

FIG. 6 is an elevational view in partial cross-section of one end of an alternative embodiment of the present invention, showing in detail the connection of the flexible pipe with the pump body, corresponding approximately to FIG. 2.

FIG. 7 is an elevational view in partial cross-section of the other end of the alternative embodiment shown in FIG. 6, showing in detail the connection of the flexible pipe with the dispenser.

DETAILED DESCRIPTION

Figure 1:
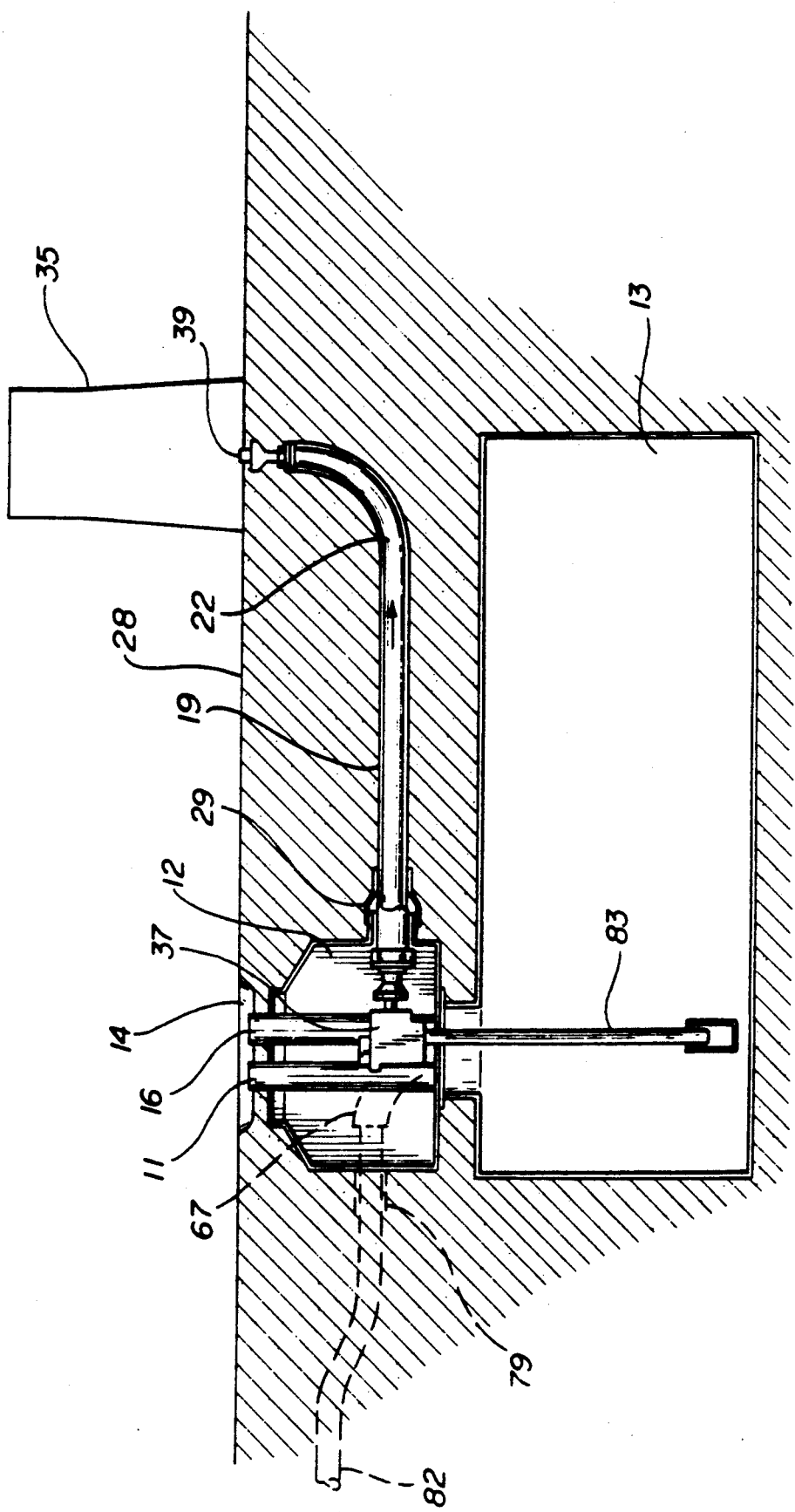
FIG. 1 is an elevational cross-section of an installed underground fuel storage tank provided with a piping system in accordance with the present invention.

FIG. 1 shows a conventional underground fuel tank 13 with a single manway 14 having a cover 14a at grade level 28, equipped with a conventional containment chamber 12, which provides access to the pump 37 and the underground piping 19,22 connected to it. The underground tank 13 is filled with fuel by opening the manway 14 and transferring fuel to tank 13 through the fill pipe 16.

A pump 37 is provided to pump fuel through input pipe 83 from the underground tank 13 through a primary pipe 22 to a fuel dispenser coupling 39 providing input to a fuel dispenser 35. The fuel dispenser 35 may be a conventional service station gas pump. In accordance with the present invention, a secondary pipe 19 jackets the primary pipe 22 and provides containment for any fuel that might leak out of primary pipe 22.

To enter the containment chamber 12, one removes the cover 14a, exposing the vapor recovery pipe 11 and the fill pipe 16, which can then be removed from grade level 28.

Figure 2:
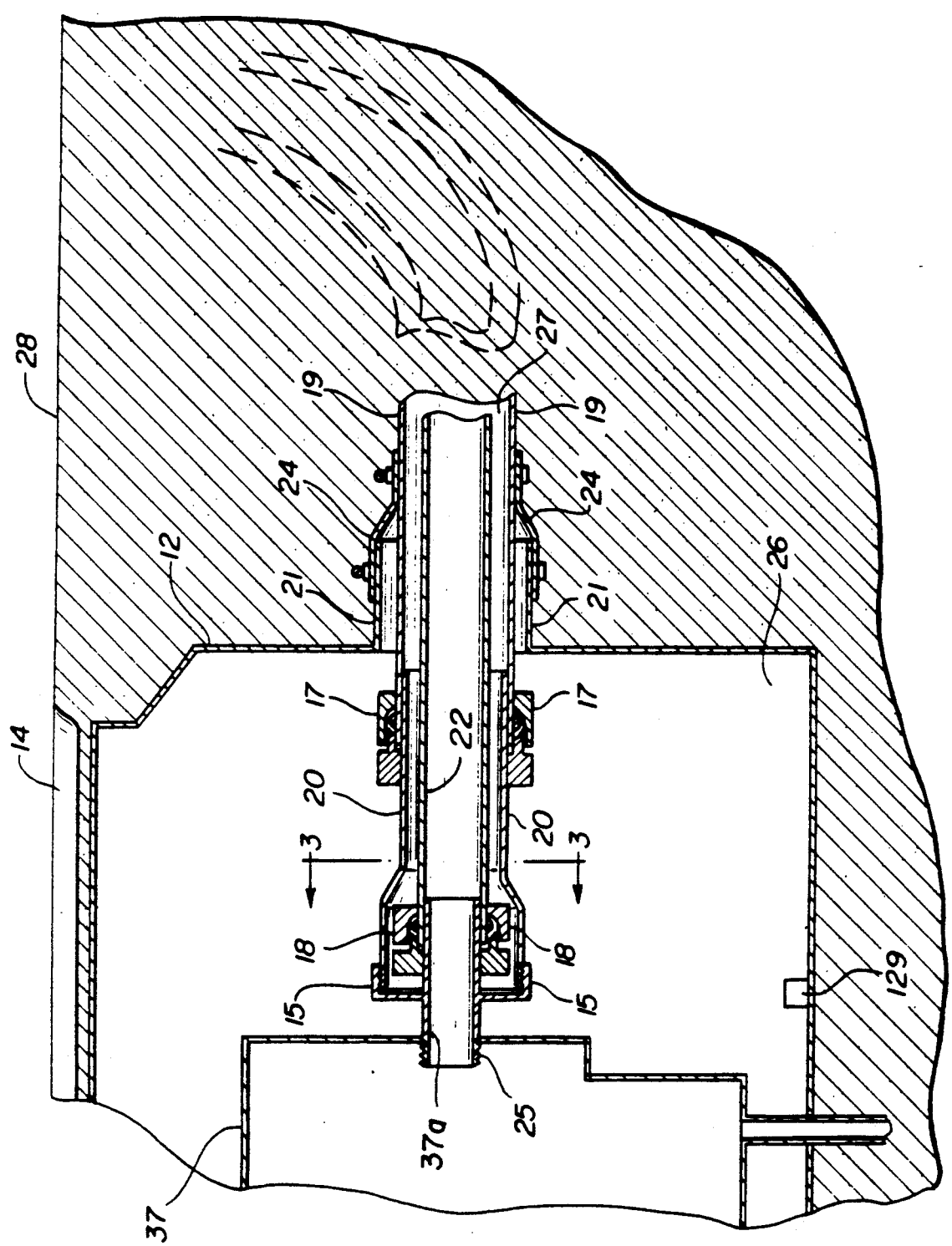
FIG. 2 is an elevational cross-section of a portion of the piping system of FIG. 1 showing in greater detail the connection of the flexible pipe with the pump body.
Figure 3:
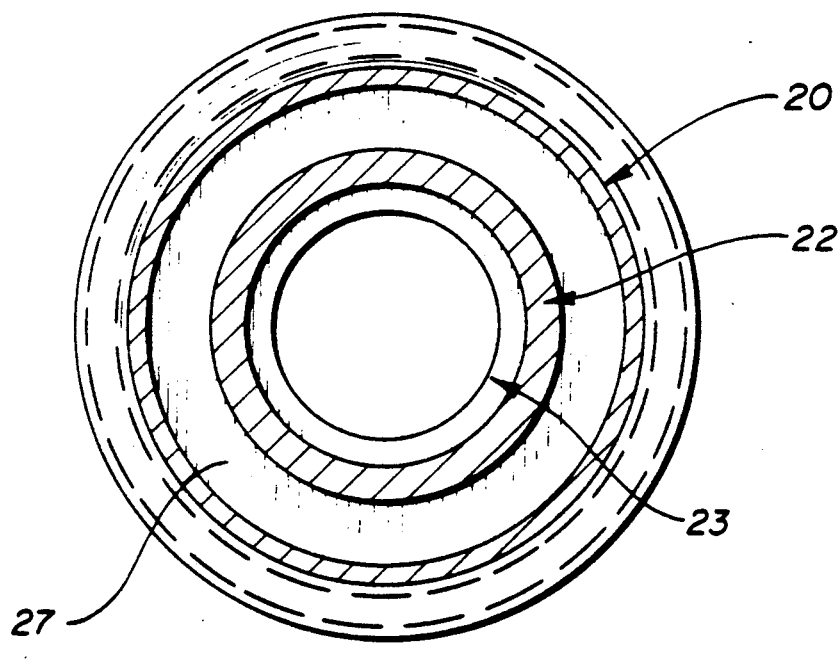
FIG. 3 is a cross-section taken along the line 3—3 of FIG. 2.

As shown in FIG. 2, the compression fittings 17, 18 for the secondary pipe 19 and the primary pipe 22 are now accessible from the containment chamber 12. The compression fitting 17 for the secondary pipe 19 is disconnected. The male-threaded secondary pump coupling 20 is next unscrewed from the female-tapped piping adaptor 15, and the secondary pump coupling 20 is forced away from the pump body and adaptor, thereby exposing the compression fitting 18 connecting the primary pipe 22 with the adaptor 23. The compression fitting 18 can now be disconnected, thus disconnecting the primary pipe 22 and the secondary pipe 19 from the piping adaptor 23 and the pump body 37. The other ends of the primary pipe 22 and secondary pipe 19 are similarly disconnected from the dispenser coupling 39 at or about grade level 28.

The inner primary pipe 22 can now be "fished" or pulled up and out from the outer secondary pipe 19 from grade level 28. The primary pipe 22 and the secondary pipe 19 are accessible at both ends—below grade at the interface with the containment chamber 12, and at or about grade level 28 at the fuel dispenser coupling 39. Since the pipes 19, 22 are flexible, the pipe may be shipped to the field site where the tank is installed and cut at the job site to the desired length.

The piping adaptor 23 is a forged or cast custom fitting including two-inch outside diameter inner pipe 23a connected to the outlet port 37a of the pump body 37 below ground. The dispenser coupling 39 is a corresponding fitting connected to the dispenser inlet port, which conventionally extends from a shear valve. The flexible primary pipe 22, desirably of two-inch inner diameter fits over the inner pipe 23a of the piping adaptor 23. The compression fitting 18 clamps and firmly secures the primary pipe 22 to the piping adaptor 23. The length of the inner pipe 23a of the piping adaptor 23 is typically two pipe diameters. The compression fitting 18 may be substituted with a common hose clamp, strap or other fitting.

The secondary pump coupling 20 is a four-inch outside diameter steel pipe adapter with external male threads. It screws at one threaded end 25 into the outer piping adapter 15. The flexible secondary pipe 19 is desirably of four-inch inside diameter hose piping. It slides over the free end of the secondary pump coupling 20. A compression fitting 17 clamps and firmly secures the secondary pipe 19 to the secondary pump coupling 20.

After installation of the flexible piping system, the secondary pipe 19 is rendered inflexible as it is buried in the ground. The secondary 19 serves as a guide for the primary pipe 22 which slides into or is retractable from it.

The piping adaptor 23 has a male thread 25 that screws into the pump body 37. (In some cases where the pump has a standard male connection, a standard pipe coupling may be necessary to connect the piping adaptor.) Once the piping adaptor 23 is screwed into the port 37a of the pump body 37, the piping adaptor 23 is fixed and is generally not removed.

A boot 24 is used to seal the entry of the secondary pipe 19, where pipe 19 enters the containment chamber 12 by connecting to a sleeve 21 which is an integral part of the containment chamber 12.

If the primary inner pipe 22 leaks, the leakage is contained in the annular space 27 between the primary pipe 22 and secondary pipe 19, and will not escape into and flood the containment chamber 12. If a leak arises at the juncture of the pipe 22 and pump body 37, or at either of the two compression fittings 17 or 18, the presence of boot 24 ensures that the leak is contained in the piping containment chamber 12 and does not overflow into the surrounding soil. The boot 24 also prevents leakage from the fill pipe 16 from escaping from the containment chamber 12 into the soil.

The annular space 27 between the coaxial primary pipe 22 and secondary pipe 19 can be tested for leakage by locating one or more sensors 29 in the annular space 27 between the pipes 22 and 19.

As shown in FIG. 1, a manifold connection 67 may optionally be provided to link with another storage tank (not shown). The link is created by an inner, primary pipe 82, which is surrounded coaxially by a secondary, containment pipe 79 extending from the manifold connection 67 via a coupling that is equivalent to that between the pump 37 and the pipes 19,22 that extend to the dispenser 35.

Installation Method

To install the system shown in FIG. 1, first, the flexible outer secondary pipe 19 is installed below the ground, and then the flexible inner primary pipe 22 is inserted from the grade level 28 into the previously installed secondary pipe 19. The belowground ends of the two concentric pipes 19,22 are mechanically connected inside the containment chamber 12, which is made accessible by removal of cover 14a. The aboveground ends of the two concentric pipes 19,22 are mechanically connected inside the containment pan 138 below the fuel dispenser 35.

Accordingly there are only two mechanical fittings in the piping run—the connection at the containment chamber 12, and the connection at the containment pan 138. In accordance with the present invention, mechanical piping connections at which the underground pipe is likely to leak and which cannot be inspected visually from above ground are minimized.

This must be compared with conventional piping systems wherein many underground connections are employed, and which are buried and inaccessible. To reach these connections it is necessary to excavate much of the piping system in order to find a leak.

Furthermore, in the event of a leak at the connection 18 between the underground piping 22 and the containment chamber 12, coupling 18 may be snapped open and the inner pipe 22 may be replaced with a new pipe underground without disturbing the concrete slab at grade level 28. Accordingly, the underground piping is replaceable without going underground.

Figure 4:
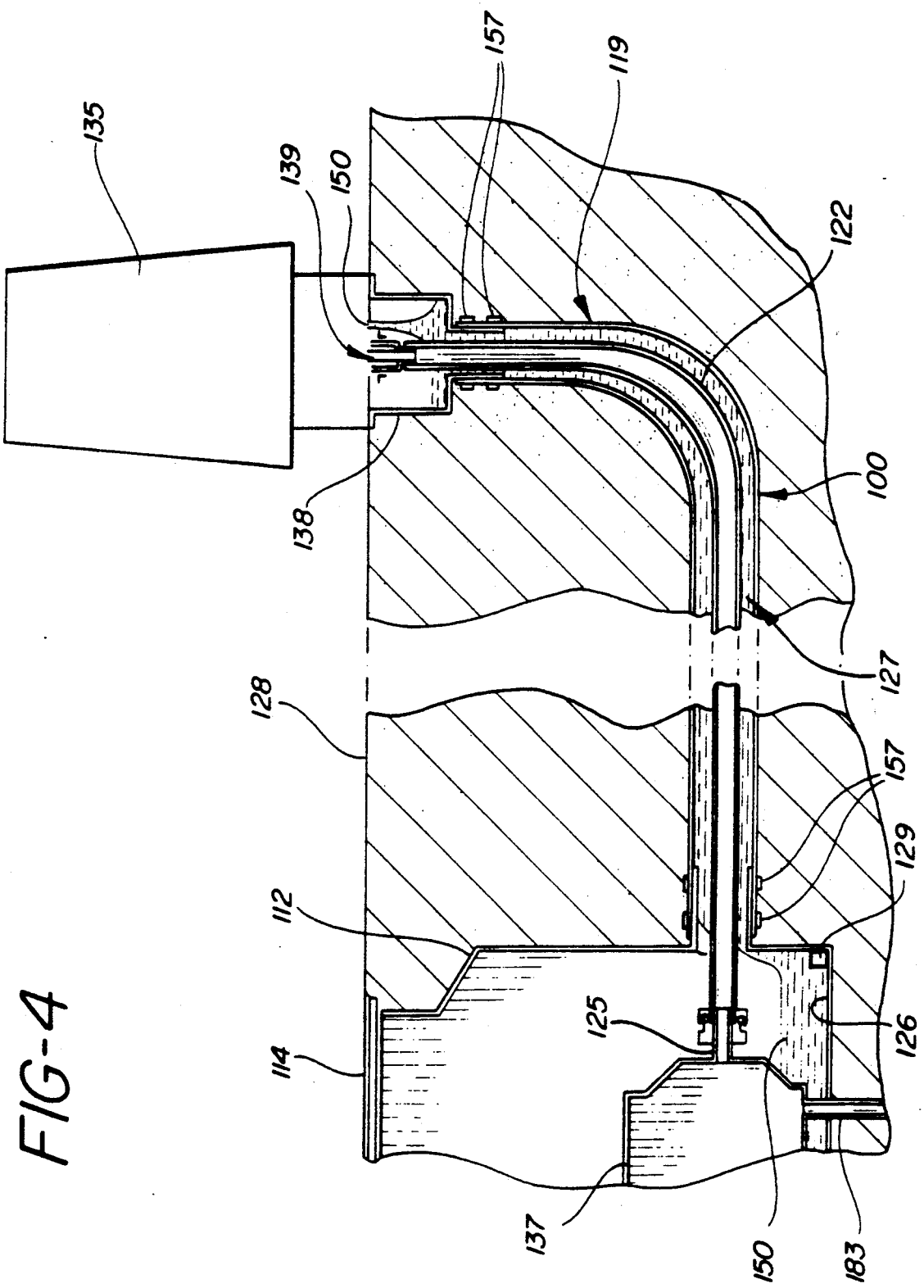
FIG. 4 is an elevational cross-section of a portion of the piping system of FIG. 1 showing in greater detail the connection of the flexible pipe with the fuel dispenser.

In FIG. 2, containment of the liquid, in the event of a leak in the primary pipe 22, will be held in the annular space 27 between the secondary pipe 19 and the primary pipe 22. FIG. 4 schematically illustrates a similar gas dispensing station with an alternate embodiment for securing the primary pipe 122 and secondary pipe 119 to the pump adapter 125 at one end and to the dispenser coupling 139 at the other end in an underground storage tank-dispenser piping system 100.

As shown in FIG. 4, fluid 150 leaking from the dispenser 135 will drip downwards from at or approximate to grade level 128 into the containment pan 138 where it will pool at the bottom thereof and flow into the annular space 127 between the primary or product pipe 122 and the secondary or containment pipe 119, from which it will drain by gravity to the bottom 126 in the containment chamber 112.

A leak from the primary pipe 122 will similarly flow into the secondary pipe 119 and travel to the bottom 126 of the containment chamber 112.

The coupling securing the primary pipe 122 to the secondary pipe 119 at the base of the dispenser 135 is connected to the bottom of the dispenser coupling 139, which conventionally includes a shear valve. This coupling is substantially similar to the coupling at the other end of the double piping system in the containment chamber 112. The secondary or containment pipe 119 is connected directly to sleeves that protrude from the containment pan 138 at one end and the containment chamber 112 at the other end. The method of connection may be stainless steel straps or bands 157 applied in the field with a strap tightening and clamping tool. Alternatively, a compression fitting may be used. Access to the containment chamber 112 is provided through the manway 114.

In the embodiments illustrated in FIG. 2 and in FIG. 4, monitoring systems 129 can be installed at the leak collection chamber 26 or 126, and necessary repairs can be performed without an undesired release of fluid to the environment. In both of the described embodiments, the primary pipe 22 or 122 can be replaced from above the ground.

The material of the primary pipe 22 or 122, and the secondary pipe 19 and 119 in the two aforesaid embodiments, is similar to the conventional "hose" construction, i.e. reinforced rubber or plastic material suitable for gasoline service.

A gasoline delivery hose—while having a short life-span above ground—will exhibit a substantially longer life when used below ground in darkness (i.e. out of bright sunlight) and in a stationary condition, as illustrated in FIGS. 1, 2, and 4. In such use, there will be no degradation of pipe material due to exposure to sunlight and no deterioration of pipe material due to wear and tear which accompanies the frequent movement of conventional above-ground pipes. Under such circumstances, life expectancy of the underground piping system shown in FIGS. 1, 2, and 4 will exceed 10 years instead of the approximately 4 year average life expectancy of conventional above-ground pipe systems.

Furthermore, in the event of very long runs of pipe between the fuel storage tank and the fuel dispenser, a repeater containment chamber 312 may be placed in the pipe run. The piping containment chamber 212, the primary and secondary piping system 222 and 219, and the fuel dispenser 235 are schematically shown in FIG. 5. The use of repeater containment chambers will be necessary in cases where the length of the primary and secondary piping system delivered to the jobsite is less than the distance between the piping containment chamber 312 and the fuel dispenser 235, or if multiple fuel storage tanks are utilized and interconnectors in the piping becomes necessary.

As shown in FIG. 5, a pump 337 having an input pipe 383 extending downwardly towards the bottom of storage tank (not shown) is within an underground containment chamber 312. A primary pipe 382 runs from containment 312 towards a dispenser 235. However, the pipe is not long enough to run all the way to dispenser 235 and instead terminates at an in-line coupling 384. The in-line coupling 384 communicates with the primary pipe 382 on the one side and with another primary pipe 222 on the other side, joining them to form a continuous passage for fluid. Clamps 357 secure pipes 382 and 222 to the coupling 384. Any leakage from either of the joints between the in-line coupling and pipe 382 or pipe 222 is contained within containment chamber 212.

If pipe 382 should leak and need to be replaced, it can be accomplished without having to replace the entire piping between the pump 337 and the dispenser 235, and correspondingly so for pipe 222.

Bellows Embodiment

Figure 7A:
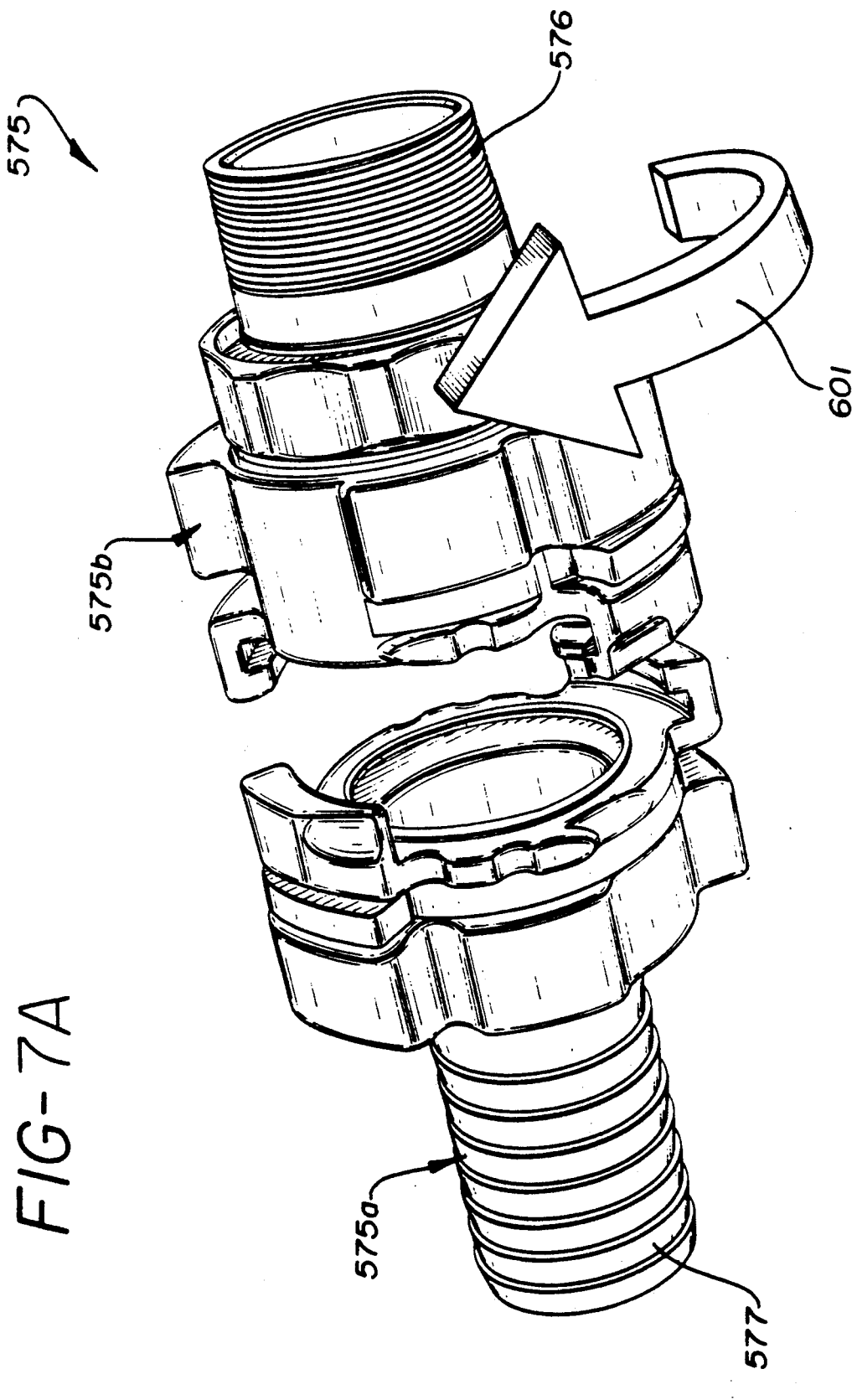
FIG. 7A is a perspective view of the quick-disconnect coupling used in the embodiment illustrated in FIGS. 6 and 7, disposed approximately as shown in FIG. 7, but in the disconnected condition.

FIGS. 6 and 7 illustrate an alternative embodiment of the invention which provides particularly advantageous assembly and disassembly. In this embodiment, the primary piping is connected to a stationary element such as a pump 537 or dispenser 535 by a banyonet-type quick-disconnect fitting 575 shown in greater detail in FIG. 7A. The secondary piping 519 is secured thereto by a bellows 590 which retracts to provide access to the quick-disconnect fitting 575 when it is desired to disconnect the primary piping 522, e.g. to replace it.

For example, as shown in FIG. 6, a pump 537 having an inlet pipe 583 extending downwardly into an underground storage tank 513 is fitted with an adaptor 523. The adaptor 523 could be molded or welded to the outlet port 540 of the pump 537, or it could be fitted to the port 540 by screw threads.

The inner portion 523a of the adaptor 523 is a straight tube with an outer diameter approximating that of the primary piping 522. Extending from the inner portion is a radial flange 523b, terminating at the juncture with an outer portion 523c coaxial with the inner portion 523a. The outer diameter of the outer portion 523c is approximately that of sleeve 580 and of the inner diameter of the secondary piping 519, inasmuch as the secondary piping 519 is clamped around sleeve 580 by compression clamp 559.

A generally cylindrical bellows 590 having extremities with inner diameters approximating that of the outer portion 523c of adapter 523 and of the sleeve 580 is clamped by bellows clamps 557 around each of these elements.

The sleeve 580 extends through an aperture 592 in the containment chamber 512 to which it is hermetically sealed as by welding or sealant 591.

As shown in FIG. 7A, the quick-disconnect fitting 575 consists of two parts, a base part 575a and a nose part 575b. The two parts separate by a relative twisting motion, as illustrated by arrow 601. This is a conventional bayonet action. The coupling is sold by Buffalo Tank Corp., Baltimore, Md. and Jacksonville, Fla., as the Advanced Coupling.

The base part 575b has a screw threaded base 576 which is secured to the adaptor 523. The nose part 575a has a male extension 577, onto which the end of the primary piping 522 is force fitted and secured by a clamp 558. The outer diameter of the nose part 575a may be less than the inner diameter of the sleeve 580, so that it is not necessary to remove the nose part 575a from the end of the primary piping 522 when retrieving it. However, it is also feasible to remove the end of the piping 522 from the male extension 577 by loosening clamp 558 before seeking to remove the primary piping 522 from the system.

In use, the bellows clamps 557 are loosened or removed, and the bellows 590 is compressed, accordion-like, to move it aside and reveal the coupling 575. The coupling 575 is disconnected, with relative twist 601 of the parts 575a and 575b, permitting the inner piping 522 to be exposed. Clamp 558, as aforesaid may then be operated if desired to loosen the nose part 575a from the piping 522.

Similarly, as shown in FIG. 7, corresponding elements to those illustrated and described with respect to FIG. 6 exist. However, the adaptor 524 may optionally have an L-shaped inner portion 524a rather than the straight inner portion 523a of the adaptor 523 previously described. Also, the sleeve 582 may extend diagonally as shown, or optionally downwardly, through an aperture in the dispenser pan 584 to which it is sealed as previously described.

Conventional elements of a dispenser 535, such as shear valve 510, a mounting angle 511 for the valve 510, a concrete pad 529 on which the dispenser 535 is mounted, and earthen backfill 599, are shown in FIG. 7, wherein grade level is indicated at 528.

From the foregoing descriptions it will be apparent that there are some embodiments of the present invention wherein the secondary piping system is most desirably open to the environment at its ends, so that fluid collecting in a dispenser pan can drain into the annular volume between the primary piping and secondary piping, and/or drain out therefrom into a containment. See FIG. 4.

Alternatively there are embodiments wherein the ends of the piping are desirably sealed by the adaptors, e.g. FIGS. 6 and 7. Such adaptors can, however, have openings built therein to modify them for use in the system shown in FIG. 4, if the opposite is desired under conditions of use.

It is apparent that the objects of the invention are fulfilled by the invention of the foregoing disclosure. It is to be understood, however, that many modifications may be made to the basic invention, some of which have been mentioned above. These and other modifications are to be deemed within the spirit and scope of the above-disclosed invention, which should be interpreted with reference to the following claims.

Having thus described the invention, what I desire to protect by Letters Patent and hereby claim is:

1. A piping system for conveying fluid from the outlet port of a pump to the inlet port of an above-ground fluid dispenser, said piping system comprising:
   a. a pump coupling comprising an inner pump pipe in communication with the outlet port of the pump and an outer piping pump adapter concentric with the inner pipe,
   b. a dispenser coupling comprising an inner dispenser pipe in communication with the inlet port of the fluid dispenser and an outer piping dispenser adapter concentric with the inner dispenser pipe,
   c. a primary pipe of flexible material having an inlet end and an outlet end, said inlet end being removably secured to the inner pump pipe and said outlet end being removably secured to the inner dispenser pipe,
   d. a secondary pipe of flexible material generally surrounding the primary pipe, said secondary pipe having a pump end and a dispenser end,
   e. secondary connectors, said secondary connectors comprising a secondary pump connector and a secondary dispenser connector,
   f. said secondary pump connector removably securing the pump end of the secondary pipe to the outer piping pump adapter, said secondary pump connector having a first end in removable sealed communication with the outer piping pump adapter and a second end in communication with the pump end of the secondary pipe, said secondary pump connector being capable of retraction so as to facilitate access to the inner pump pipe and the inlet end of the primary pipe to allow disconnection of the primary pipe from the inner pump pipe when the first end of the secondary pump connector is disconnected from said outer piping pump adapter and the secondary pump connector is retracted,
   g. said secondary dispenser connector removably securing the dispenser end of the secondary pipe to the outer piping dispenser adapter, said secondary dispenser connector having a first dispenser end in removable sealed communications with the outer piping dispenser adapter and a second dispenser end in communication with the dispenser end of the secondary pipe, said secondary dispenser connector being capable of retraction so as to provide sufficient access to the inner dispenser pipe of the dispenser coupling and the outlet end of the primary pipe to allow disconnection of the primary pipe from the inner dispenser pipe when the first dispenser end is disconnected from said outer piping dispenser adapter and the secondary dispenser connector is retracted,
   h. a containment chamber which generally surrounds the pump, said containment chamber housing the secondary pump connector, and
   i. wherein the primary pipe, the secondary pipe, the pump coupling, the dispenser coupling, the secondary dispenser connector and the secondary pump connector define an annular volume that provides containment for the fluid in the event of leakage.

2. The piping system of claim 1 wherein each of said secondary connectors comprises a flexible bellows.

3. The piping system of claim 2, wherein said secondary pump connector further includes a rigid sleeve in sealed communication with said pump end of said secondary pipe and with said flexible bellows.

4. The piping system of claim 1 wherein said secondary pump connector includes a flexible bellows.

5. The piping system of claim 1, wherein said secondary dispenser connector includes a flexible bellows.

6. The piping system of claim 1, wherein said first end of said secondary pump connector includes external male threads sized and shaped to be received in female threads in said outer piping pump adapter and said second end is removably secured to the secondary pipe such that said fluid does not leak.

7. The piping system of claim 6, wherein said second end of said secondary pump coupling is removably secured to said pipe by a compression fitting.

8. The piping system of claim 6, wherein said second end of said secondary pump connector is removably secured to said secondary pipe within said containment chamber.

9. The piping system of claim 1 further comprising a dispenser pan, capable of containing fluid, located below the dispenser and generally surrounding the secondary dispenser connector.

10. The piping system of claim 1 further comprising a fluid sensor for detecting leakage located in the annular space between the primary pipe and the secondary pipe.

11. A piping system for conveying fluid from the outlet port of an underground pump to the inlet port of an above-ground fluid dispenser, which comprises:
(a) a containment chamber installed below grade level containing the pump, said chamber comprising a body capable of containing leaked fluid, a removable cover positioned approximate to grade level, and a containment chamber sleeve in communication with the body extending outwardly therefrom;
(b) a primary pipe of flexible material for conveying the fluid from the pump, the primary pipe having an inlet end and an outlet end;
(c) means for removably securing the inlet end of the primary pipe to the outlet port of the pump such that fluid can be conveyed from said outlet port to said inlet end without leakage;
(d) a secondary pipe of flexible material generally surrounding the primary pipe such that an annular volume is formed between said secondary pipe and said primary pipe into which said leaked fluid can be contained, said secondary pipe having a lower end and an upper end, the lower end of said secondary pipe being in sealed communication with said containment chamber sleeve;
(e) a dispenser pan installed below the fluid dispenser so as to contain leakage therefrom, said dispenser pan comprising a dispenser body and a pan sleeve in communication with said dispenser pan extending in gravity draining relationship therefrom, the upper end of the secondary pipe being in sealed communication with said pan sleeve;
(f) means for removably securing the outlet end of the primary pipe in communication with the inlet port of the dispenser;
(g) retractable means for enclosing the inlet end of the primary pipe, said inlet end retractable means being in sealed communication with the containment chamber sleeve;
(h) retractable means for enclosing the outlet end of the primary pipe, said outlet end retractable means being in sealed communication with the pan sleeve; and whereby the primary pipe may be replaced by removing the cover from the containment chamber, retracting each of said retractable means, unsecuring the inlet end and the outlet end of said primary pipe, and pulling said primary pipe out through said containment chamber sleeve.

12. The piping system of claim 11, further comprising a liquid sensor in the annular space between the primary pipe and the secondary pipe.

13. The piping system of claim 12, further comprising means for applying suction to said annular volume adjacent to the upper end of the secondary pipe, whereby leakage is removable from the system.

14. The piping system of claim 11, wherein the means for removably securing the inlet end of the primary pipe and the means for removably securing the outlet end of the primary pipe are clamping means.

15. The piping system of claim 11, wherein the means for removably securing the inlet end of the primary pipe and the means for removably securing the outlet end of the primary pipe are each bayonet fittings.

16. The piping system of claim 11, wherein said inlet end retractable means and said outlet end retractable means each comprise a flexible bellows.

17. The piping system of claim 11, wherein said inlet end retractable means comprises a rigid sleeve mounted in the containment chamber and said outlet end retractable means comprises a rigid sleeve mounted in said dispenser pan.

* * * * *